US008717425B2

(12) United States Patent  
Hardison

(10) Patent No.: US 8,717,425 B2  
(45) Date of Patent: May 6, 2014

(54) SYSTEM FOR STEREOSCOPICALLY VIEWING MOTION PICTURES

(76) Inventor: Leslie C. Hardison, Cape Coral, FL (US)

(*) Notice: Subject to any disclaimer, the term of this patent is extended or adjusted under 35 U.S.C. 154(b) by 412 days.

(21) Appl. No.: 13/373,560

(22) Filed: Nov. 18, 2011

(65) Prior Publication Data

US 2013/0128014 A1 May 23, 2013

(51) Int. Cl.  
*H04N 13/04* (2006.01)

(52) U.S. Cl.  
USPC .................................................... 348/54

(58) Field of Classification Search  
USPC ............................................ 348/54, E13.026  
See application file for complete search history.

(56) References Cited

U.S. PATENT DOCUMENTS

| 3,501,230 | A | | 3/1970 | Johnston |
|---|---|---|---|---|
| 4,127,322 | A | | 11/1978 | Jacobson et al. |
| 4,185,898 | A | | 1/1980 | Seitz |
| 4,290,083 | A | | 9/1981 | Collender |
| 4,340,878 | A | | 7/1982 | Spooner et al. |
| 4,348,187 | A | * | 9/1982 | Dotsko ............................ 434/44 |
| 4,509,835 | A | * | 4/1985 | Adler ............................. 352/43 |
| 4,568,970 | A | | 2/1986 | Rockstead |
| 4,740,836 | A | * | 4/1988 | Craig ............................. 348/49 |
| 5,034,809 | A | | 7/1991 | Katoh |
| 1,419,901 | A | | 6/1992 | Lehnhoff-Wyld |
| 5,283,640 | A | | 2/1994 | Tilton |
| 5,357,369 | A | | 10/1994 | Pilling et al. |
| 5,619,256 | A | | 4/1997 | Haskell et al. |
| 5,801,761 | A | | 9/1998 | Tibor |
| 6,078,352 | A | | 6/2000 | Nakaya et al. |
| 6,288,741 | B1 | | 9/2001 | Trevijano |
| 6,361,188 | B1 | | 3/2002 | Kuts |
| 6,621,530 | B1 | | 9/2003 | Hall, Jr. et al. |
| 6,819,415 | B2 | | 11/2004 | Gerstner et al. |
| 2002/0113944 | A1 | | 8/2002 | Youn |
| 2003/0011751 | A1 | | 1/2003 | Sakata et al. |
| 2003/0058209 | A1 | | 3/2003 | Balogh |
| 2005/0001982 | A1 | | 1/2005 | Youn |
| 2005/0151938 | A1 | | 7/2005 | Onaga |
| 2007/0103546 | A1 | | 5/2007 | Collender et al. |
| 2007/0139760 | A1 | | 6/2007 | Baker et al. |
| 2007/0146358 | A1 | | 6/2007 | Ijzerman |
| 2008/0144175 | A1 | | 6/2008 | Simonsen |
| 2009/0109404 | A1 | | 4/2009 | Thornton |
| 2009/0129667 | A1 | | 5/2009 | Ho et al. |
| 2009/0251463 | A1 | | 10/2009 | Tsuboyama |

* cited by examiner

*Primary Examiner* — Mehrdad Dastouri  
*Assistant Examiner* — Mohammed Rahaman  
(74) *Attorney, Agent, or Firm* — Meroni + Meroni, P.C.; Charles F. Meroni, Jr.; Christopher J. Scott

(57) ABSTRACT

Moving pictures, as may be exemplified by television programming, are viewed stereoscopically. The system preferably comprises a visual display screen upon which may be displayed a left-to-right reversed visual display. A reflecting surface is positioned opposite the visual display screen for reflecting imagery from the visual display screen toward the viewer. The reflected imagery provides a reflected left-to-right correct visual display. The visual display screen is spaced from the reflecting surface such that the viewer's perception of the visual display screen causes the viewer to focus on a point behind the reflecting surface thereby requiring the viewer to perceive laterally offset reflections of the visual display screen at the reflecting surface. In one embodiment, a cabinet assembly enables the viewer or user to selectively position the visual display screen relative to the primary reflecting surface for enhancing the perception of depth in imagery effected by the perceived laterally offset reflections.

23 Claims, 8 Drawing Sheets

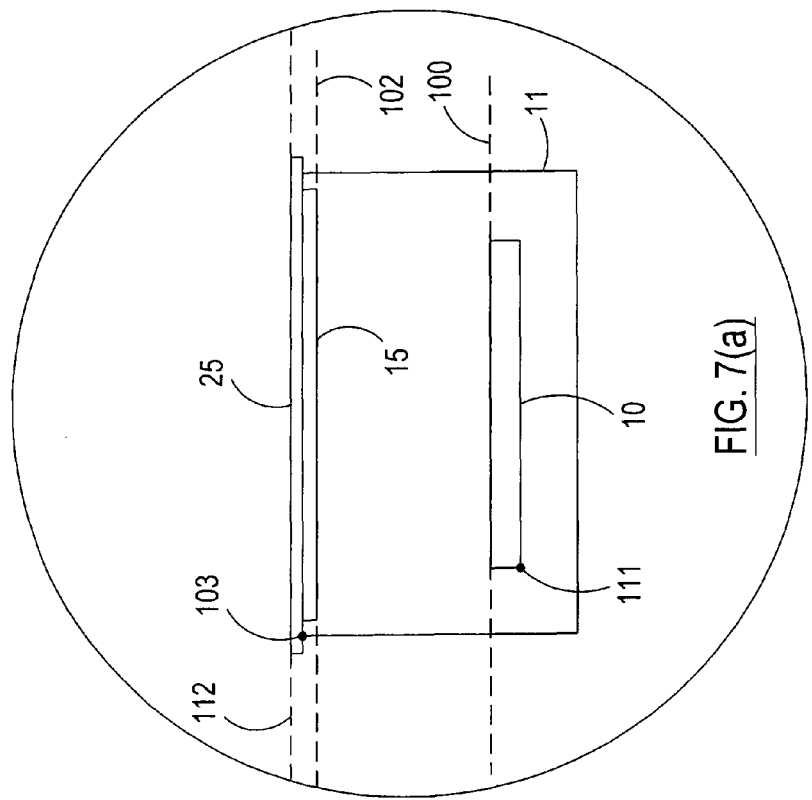
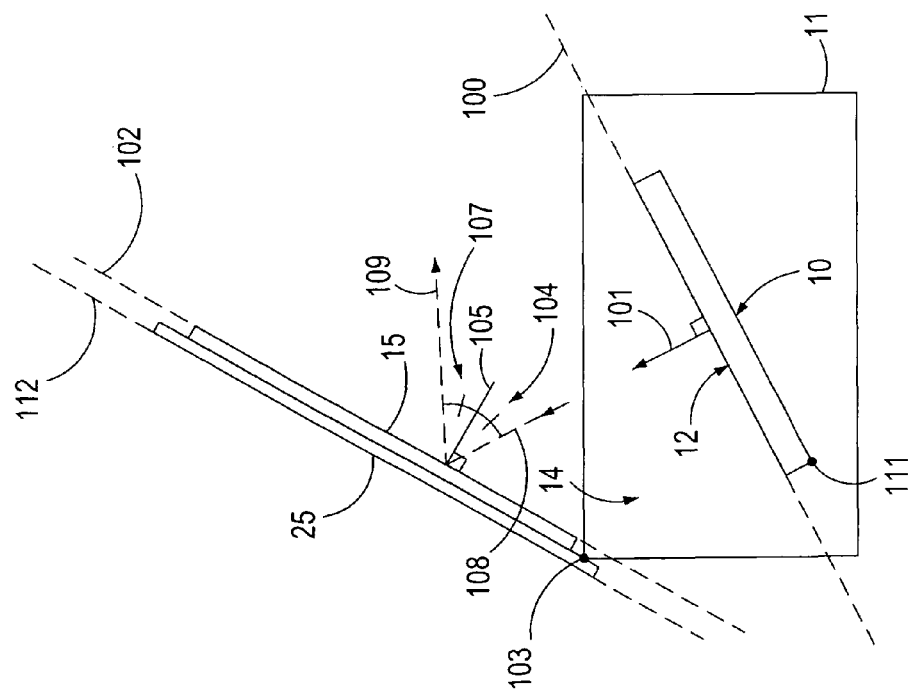
FIG. 7(a)
FIG. 7

SYSTEM FOR STEREOSCOPICALLY VIEWING MOTION PICTURES

BACKGROUND OF THE INVENTION

1. Field of the Invention

The present invention generally relates to television technology, and more particularly, to a system, assembly, and method for viewing television-based programming or similar other visual material such as photographs or movies in three-dimensions without the requirement of special formatting of the visual material, special electronic equipment or three-dimensional eyewear or other user-worn apparatus.

2. Description of Prior Art

Stereoscopy (also called stereoscopic or three-dimensional (3-D) imaging) refers to a technique for creating or enhancing the illusion of depth in an image by presenting two (2) two-dimensional, offset images separately to the left and right eye of the viewer. Both of the two-dimensional, offset images are then combined in the brain to give the perception of three-dimensional depth. Four general strategies have been used to accomplish stereoscopic imaging, three of which employ specialized eyewear, and one of which requires no eyewear.

Those requiring special eyewear are: (1) recording and projecting simultaneously left and right images through filters of different colors, and providing the viewer with glasses using colored lenses of filters to allow each eye to see only the portion of the dual picture taken with the appropriate camera. (2) recording and projection of two distinct images, made by using dual cameras, displaying the left and right images alternately on the television of movie screen, and providing a means, such as electronic shutter glasses or circularly polarized glasses to direct separate left and right camera images to the left and right eye of the viewer.

(3) Utilizing ordinary television pictures taken with a single camera, but shown on a modified television set with the capability of presenting viewing frames at at least twice the normal rate (120 Hz vs. 60 Hz) with internal software which presents every second frame altered by a very slight horizontal offset, which simulates much of the difference the two eyes would see if viewing the same scene from an intermediate distance. Again, shutter glasses are used to permit the left eye to see on the unaltered scene, while the right eye sees only the slightly shifted scene.

The method of permitting three-dimensional effects without special eyewear in special cameras and hand held devices utilized two cameras, and produces two images internally. These are viewed on a screen which is composed of tiny vertical sections arranged at such an angle to each other that the left eye can only see vertical elements on which the left picture is visible, and the right eye can see only the picture intended for the right eye.

No special glasses are worn by the viewer, but the technique is only usable when the distance from the viewer to the complex screen is on the order of 20 inches or so. At closer distances both eyes can see both sets of vertical elements, and at much greater distances, both eyes see the same set of elements. In either of these cases there is no three-dimensional effect created, so the method is not directly applicable to large screen television sets or movie theater presentations.

The art of enabling viewers to view motion pictures without the requirement for, or the use of specialized eyewear reportedly dates from the 1930's. In this regard, the reader is directed to U.S. Patent Application Publication No. 2007/0103546, authored by Collender et al., who provide a fairly decent historical synopsis for the history of glasses-free three-dimensional motion picture technology without glasses. The reader is thus invited to inspect said publication for further information regarding the historical development of three-dimensional motion picture viewing independent of eyewear. Other patent-related disclosures illustrative of the pertinent art are briefly described hereinafter.

U.S. Pat. No. 1,419,901 ('901 patent), which issued to Lehnhoff-Wyld, discloses a Device to Obtain Stereoscopic Effects in Cinematographic Projections. The device incorporates the use of a spherical mirror, a screen arranged between the focus and the center of the mirror, and a projecting apparatus. The screen is inclined to reflect on the concave mirror the image projected by said apparatus and to obtain a true and large and not reversed image of the scene projected on the screen, which screen comprises a convex surface to correct the deformations of the horizontal lines and other distortions of the image projected.

U.S. Pat. No. 3,501,230 ('230 patent), which issued to Johnson, discloses a Three-Dimensional Display System. The '230 patent describes a three-dimensional viewing system which has a viewing surface which diffuses incident of light rays in a vertical direction only. A plurality of images is projected from image sources onto the viewing surface simultaneously such that the images are superimposed. Each image is a view of the same photographed scene but represents the view as seen from a different vertical plane through the scene. Each image source is displaced from the viewing surface by a different distance, the source farthest away from the viewing surface representing the view of the scene from the greatest distance such that as a viewer moves from side to side of the viewing surface the elements shown by the different image sources will appear to move with respect to each other.

U.S. Pat. No. 4,509,835 ('835 patent), which issued to Adler, discloses a Three Dimensional Cinema and Novel Projector System Therefor. The '835 patent describes certain three dimensional viewing achieved through use of multiple lens camera with included erector lens which yield a multiplicity of side by side medium-carried-images with provisions for some overlap and subsequent projection of said images by means of a plurality of spaced parabolic mirror reflectors on opposite sides of a diffusion screen, said reflectors being optically focused and mutually arranged to yield an ultimate, reflected, virtual image of three dimensional character over a relatively wide viewing range occupied by a plurality of viewers. System adapted for home television or commercial movie (cinema) projection.

U.S. Pat. No. 4,740,836 ('836 patent), which issued to Craig, discloses a Compatible 3D Video Display Using Commercial Television Broadcast Standards and Equipment. The '836 patent describes a video display operating at standard commercial television broadcast sweep rates, line spacing and/or pixel density. An over and under split screen presentation of a stereoscopic pair of images permits three dimensional viewing by audiences of any size using simple optical deviation elements mounted in a pair of spectacles.

Besides being compatible with broadcast standards, the display is compatible with the format already used in producing 3D motion picture films permitting unaltered broadcast of such films and/or direct transfer to video tape with existing equipment. The recorded video can then be viewed by said optical deviation elements. The final display, when viewed stereoscopically, exhibits an aspect ratio of more than twice the width to height which is about the same as motion picture screens and well suited for display of sporting events regularly broadcast on television. The said display is compatible with normal viewing without the stereoscopic impression, by the unaided eyes and seen in full color with normal clarity and definition.

U.S. Pat. No. 6,361,188 ('188 patent), which issued to Kuts discloses a Method and Apparatus for Generating Three Dimensional Light Patterns. The '188 patent describes a method and apparatus for generating a three-dimensional image comprising one or more laser beams directed at one or more mirrors. Each mirror is flexibly attached to the vibrating portion of a transducer such as a speaker, the transducer being coupled to a signal source. Suitable signal sources include radio and television tuners, CD players, tape decks, VCRs, musical instruments with suitable signal outputs, and signal generators. The laser beam(s) reflected by the mirror(s) is directed at a rotating viewing surface, the viewing surface being semi-transparent. Due to the rotation of the viewing surface, a three-dimensional image is formed that can be viewed from multiple angles.

United States Patent Application No. 2002/0113944, which was authored by Youn, describes an apparatus for displaying a 3-dimensional image comprising left and right plane image display devices for simultaneously outputting left and right plane images received with respect to a same object from the left and right sides to a screen, left and right image inverting apparatuses for inverting original left and right images and outputting the inverted images to the left and right plane image display devices, a left reflection mirror, on which an image output from the left plane image display device is incident at a predetermined angle and by which the left image is reflected at the same angle, so that the left image is perceived by a left eye of a viewer, and a right reflection mirror, on which an image output from the right plane image display device is incident at a predetermined angle and by which the right image is reflected at the same angle, so that the right image is perceived by a right eye of a viewer.

Thus, unlike the conventional 3-D display apparatus having a complicated structure but no general usability, a 3-D image can be easily realized without additional apparatuses by arranging the two plane image display devices and image inverting apparatuses to the left and right sides and the reflection mirrors in the middle therebetween and adjusting the incident and reflection angles of the reflection mirrors.

The Youn invention is applicable to hand held devices which the viewer can comfortably use only within a narrow range of distances between his eyes and the screen, and the viewer must be very nearly opposite the center of the screen for the three-dimensional effect to be perceived. Thus, Youn is not applicable to commercial television or movie theater viewing.

United States Patent Application No. 2003/0058209, which was authored by Balogh, describes a method and apparatus for the presentation of three-dimensional images, where light beams with appropriate intensity and optionally with appropriate color are projected in different viewing directions and thereby creating a three-dimensional image. The light beams are created with a light emitting surface comprising cyclically addressable light sources. The surface is positioned behind a screen comprising pixels with a controllable light transmission or reflection.

The light beams emitted from different light sources illuminate the individual pixels from different directions. According to the invention, the distance between the light sources is larger than the distance between the pixels, and the light sources are positioned so much away from the pixels so that the number of pixels illuminated by one light source is greater than the number of light sources illuminating one pixel.

United States Patent Application No. 2005/0001982, which was authored by Youn, describes a system for providing a three dimensional image from at least two plane images. The system includes first and second image display devices substantially simultaneously outputting first and second plane images, each plane image produced at different positions with respect to an object.

The system also includes first and second mirrors configured such that the output first and second plane images are incident to the first and second mirrors and reflected in a direction, respectively. The system provides for either manual or automatic adjustment of the distance between the first and second mirrors such that the incident angle and reflection angle of the plane images are maintained to be substantially identical after each adjustment.

Collender et al. describe subject matter in United States Patent Application No. 2007/0103546 that is perhaps the most pertinent as compared to the subject invention. In an attempt to improve upon the state of the art, Collender et al. describe a movie theater that includes a screen located between the front and back of the movie theater, a substantially spherically concave mirror proximal the front of the movie theater; and a viewing volume located between the screen and the mirror such that each observer in the viewing volume can see in their respective pair of eyes a reflection in the mirror of a scene that is displayed on the screen.

Further, any observer at substantially all locations within the viewing volume can see a three dimensional view of the scene displayed on the screen. For each observer a substantially identical reflection from the substantially spherical concave mirror of the moving pictures on the substantially spherical convex screen will be received at the observer's retinas, and substantially all of the observers can see a three dimensional view of the moving pictures.

It will be seen from an inspection of the prior art that the prior art perceives a need for a system, assembly, and method for enabling a television watcher to watch or view three-dimensional television-based visual displays without specialized eyewear and from state of the art television systems that display visual material in two-dimensions. In other words, the is a perceived need in the art to provide users of standard two-dimensional televisions with a means for viewing visual displays upon said two-dimensional televisions in three-dimensions without requiring the producer of the television programs, or the manufacturer of the television set to use any special design or techniques, nor the viewer to don specialized eyewear.

SUMMARY OF THE INVENTION

The present invention provides a novel technique for rendering two-dimensional imagery taken by ordinary cameras and projected onto visual display screens or similar other viewing surfaces into three-dimensional images, in which depth is clearly registered by the mind, without the necessity of wearing glasses to create separate images for viewing by the left and right eyes. Instead, a simple mirror arrangement is utilized to separate the images viewed by the two eyes such that the brain can assign distances to the objects being viewed, which results in the perception of depth.

The present invention should not be mistaken for providing true three-dimensional viewing in which the eyes see distinctly different images, and which can be ascertained by moving the head back and forth in which case the relative position of foreground and background objects will change. In the three-dimensional viewing of two-dimensional photography or cinematography, there is not sufficient visual information available to do this.

However, the brain is capable of forming the three-dimensional image from much less information, and tends to use all sorts of visual information and so forth to do so. Such information includes the relative size of objects (small implies far away), the brightness and contrast (low brightness and contrast suggest objects are distant), and the physical focus to the lenses of the eyes. Of great importance of viewing nearby objects is the difference between the images received by the left and right eyes. This process is ubiquitous in everyday life in situations involving insufficient differences in imagery perceived by the human eye arrangement (e.g. because of large distances to the viewed objects) and the perception of depth is automatic and naturally occurring.

According to the present invention, three-dimensional viewing is limited, yet produces a markedly improved image with most of the elements of true three-dimensional viewing. This is achieved without the requirement for specialized eyewear, specialized television sets or assemblies, specialized filming techniques, etc. Conceivably, many possible configurations can be developed in which the novel effect can be brought to bear on the problem of producing and viewing images which appear to have depth, although made without the aid of any sort of stereoscopic equipment.

Accordingly, it is a primary object of the present invention to provide certain means for enabling a television watcher to watch or view visual imagery in three-dimensions from a television set that would otherwise display visual imagery in two-dimensions, and without an eyewear requirement. To achieve these and other readily apparent objectives, the present invention essentially and firstly requires a primary, conventional, (flat screen) television viewing apparatus or assembly.

Further required are certain means for left-to-right reversing the image produced by the television viewing apparatus or assembly; a reflective surface for producing a secondary or reflected viewing image; and a geometric arrangement of the primary and secondary or reflected images and the viewing audience so as to render the viewing of the primary image reflected in the secondary image with appropriate spacing or distancing so as to produce the impression of (three-dimensional) depth in the secondary image

BRIEF DESCRIPTION OF THE DRAWINGS

Other features of my invention will become more evident from a consideration of the following brief description of patent drawings:

FIG. 7 is a fragmentary enlarged diagrammatic depiction of the essential components otherwise depicted in FIG. 5, the same being enlarged to more clearly depict pivot axes, and structural planes associated with the cabinet assembly, primary mirror, and television assembly.

FIG. 7(a) is an alternative diagrammatic depiction of the essential components otherwise depicted in FIG. 6, the same being alternatively diagrammed to show the cabinet assembly in a closed position for enclosing the primary mirror and television assembly within the cabinet assembly.

DETAILED DESCRIPTION OF THE PREFERRED EMBODIMENT

Stereoscopy (also called stereoscopic or three-dimensional (3-D) imaging) refers to a technique for creating or enhancing the illusion of depth in an image by presenting two (2) two-dimensional, offset images separately to the left and right eye of the viewer along with other visual clues as to distance. Both of the two-dimensional, offset images are then combined in the brain to give the perception of three-dimensional depth.

The purpose of the invention is to enable the viewer to perceive essentially the same sort of three-dimensional image when viewing a two-dimensional picture on a television screen or similar device, without the need for wearing special glasses. This brought about by causing the viewer to focus his eyes, not on the television screen, but on a mirror image of the television screen. When he does so, the natural tendency is to focus the eyes, not on the flat surface of the mirror, but on the perceived image of the television screen in the mirror, which lies as far behind the mirror as the television is in front of the mirror.

Figure 1:
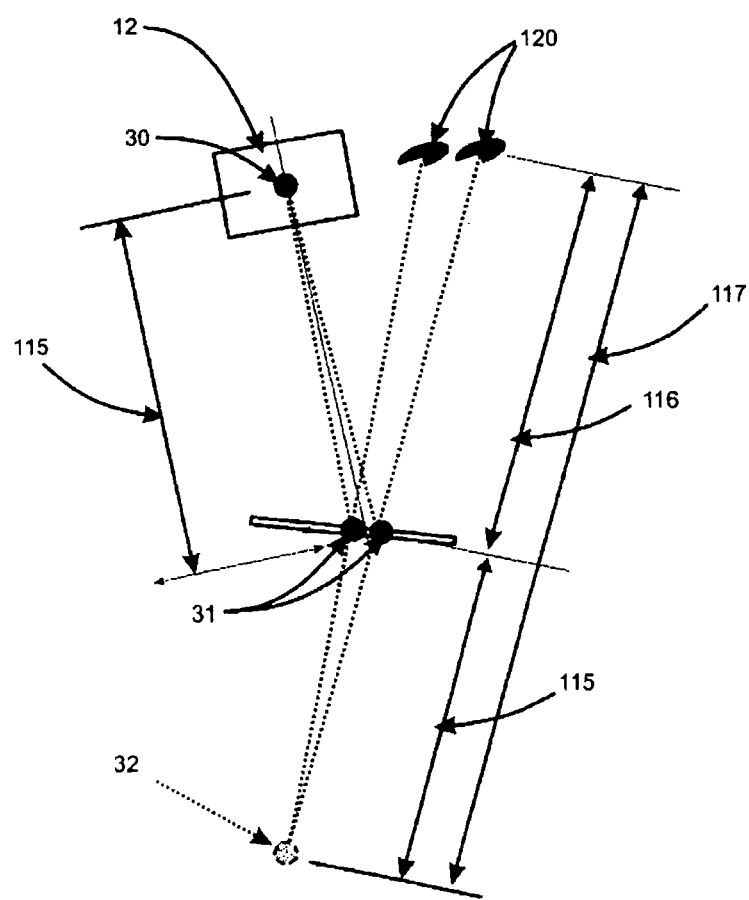
FIG. 1 is a diagrammatic depiction of a visual display screen showing a single dot, and a primary mirror adjacent the screen in which a phantom dot is seen behind the mirror surface, and at the surface of which two offset dots are located.

Typically, when the viewer of a television set or television assembly 10 is watching an image 18 on a visual display screen 12, the viewer's eyes 120 are focused at the distance to the visual display screen 12, and both eyes 120 see essentially the same image 18 in the same place. In FIG. 1, the dot 30 represents any one of the several thousand pixels the viewer sees to form the image as generally depicted at 18/22.

When the dot 30 on the visual display screen 12 is viewed in a flat mirror as at 15, the image appears to be, not on the surface of the mirror 15, but rather behind it (as at phantom dot 32) at the distance 115 the mirror 15 is from the visual display screen 12. Thus, the viewer focuses his or her eyes 120 beyond the surface of the mirror 15. This means that the two eyes 120 are not focused on the same location of the surface of the mirror 15 to see the image (as at phantom dot 32), but rather on two separate points (as at dots 31).

The two points or dots 31 are separated by the distance between the two eyes 120 (typically ranging between 2-4 inches) times the ratio of the distance 115 of the mirror 15 from the visual display screen 12 plus the distance 116 of the viewer's eyes 120 from the mirror 15 (i.e. distance 117) divided by the distance of the mirror 15 from the visual display screen 12. Thus, if the eyes 120 were a minimal distance (or nearly zero distance) from the mirror 15, the two images (as at dots 31) of the point appearing on the mirror surface would be separated almost as far as the eyes 120 are separated, and if the mirror 15 were very far (or nearly infinite distance) from the visual display screen 12, there would be scarcely any separation at all.

Figure 1A:
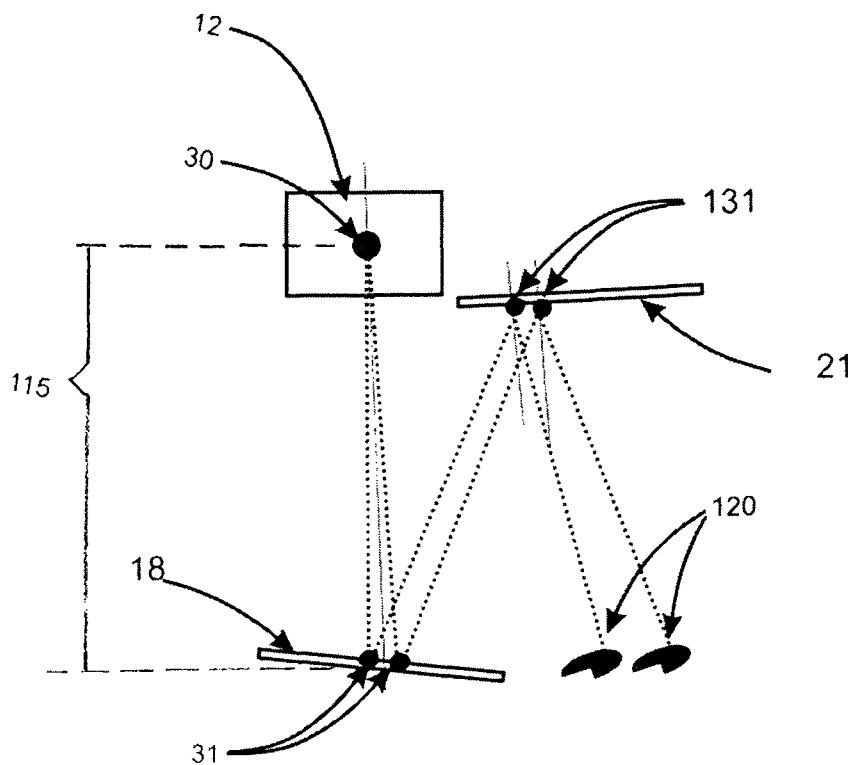
FIG. 1(a) is a first diagrammatic depiction of a visual display screen showing a single dot, a secondary mirror opposite the screen, and a primary mirror opposite the secondary mirror adjacent the screen, the mirror arrangements for reflecting screen-based imagery to the primary mirror at the surface of which two offset dots are located.

FIG. 1(a) is a diagrammatic depiction of an arrangement comprising visual display 12 whereon a single pixel or dot 30 is selected by way of illustration. Each eye 120 of the viewer sees the pixel/dot 30 as reflected in the secondary reflecting surface or mirror 21 as a pair of images 131, which are, in fact, the reflection of the pixel/dot 30 in the primary reflecting surface or mirror 15.

The viewer perceives, not the picture comprising the pixel/dot 30 and all of the other pixels making up the visual display or image on the visual display screen 12, but rather an image of visual display screen 12 which appears to be behind the secondary reflecting surface 21 by a distance approximately twice the distance from the visual display screen 12 to the primary reflecting surface or mirror 18.

By virtue of the fact that each eye 120 sees each pixel/dot 131 in a slightly different placement on the secondary reflecting surface or mirror 21, the brain receives visual information similar to that received when the eyes 120 are perceiving an actual three dimensional panorama.

Figure 1B:
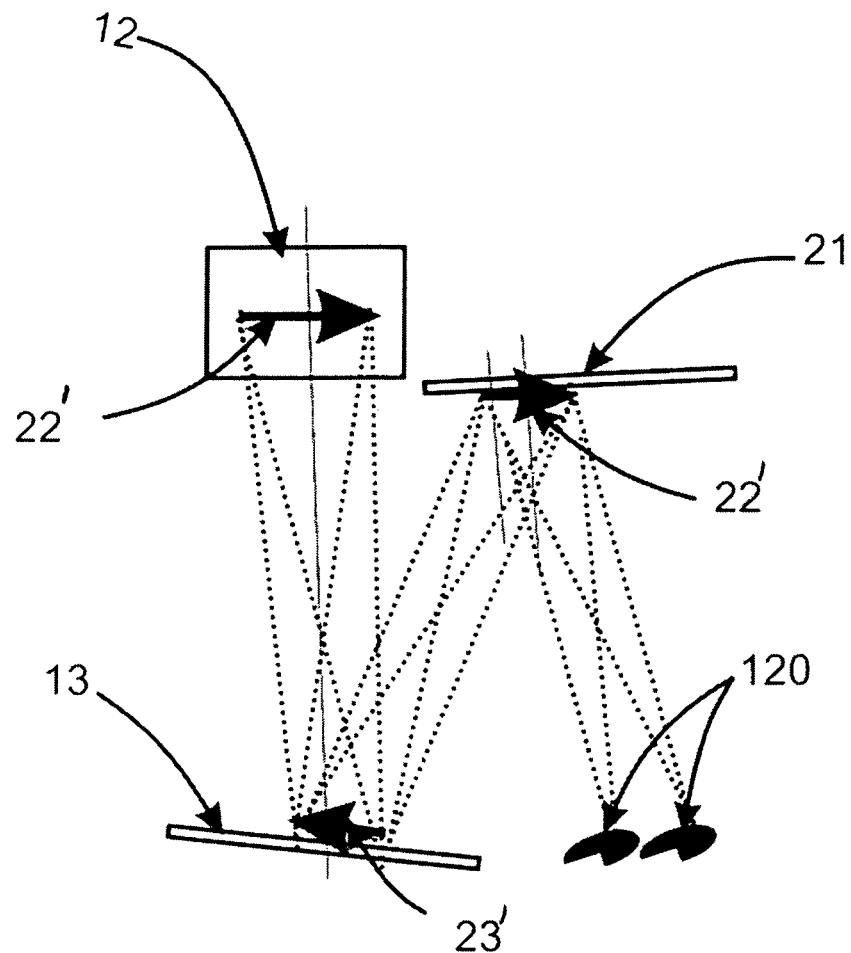
FIG. 1(b) is a second diagrammatic depiction showing the components arranged in FIG. 1(a), showing vector arrows for depicting left-to-right image reversal and correction.

The two mirror arrangement depicted in FIG. 1(a) has the added advantage that there is no electronic modification of the television receiver or computer monitor required to provide correction for the reverse image problem inherent in viewing images in reflective surfaces. This phenomenon is illustrated in FIG. 1(b).

Here, for illustrative purposes, a directional image-arrow or image-vector 22' is shown on the visual display screen 12. Ordinarily, the image of this display is reflected from the primary reflecting surface 18 backwards (as at 23') as compared to image-vector 22'. In other words, the image 18 is left-to-right reversed or left-right exchanged in the perceived view.

Figure 8A:
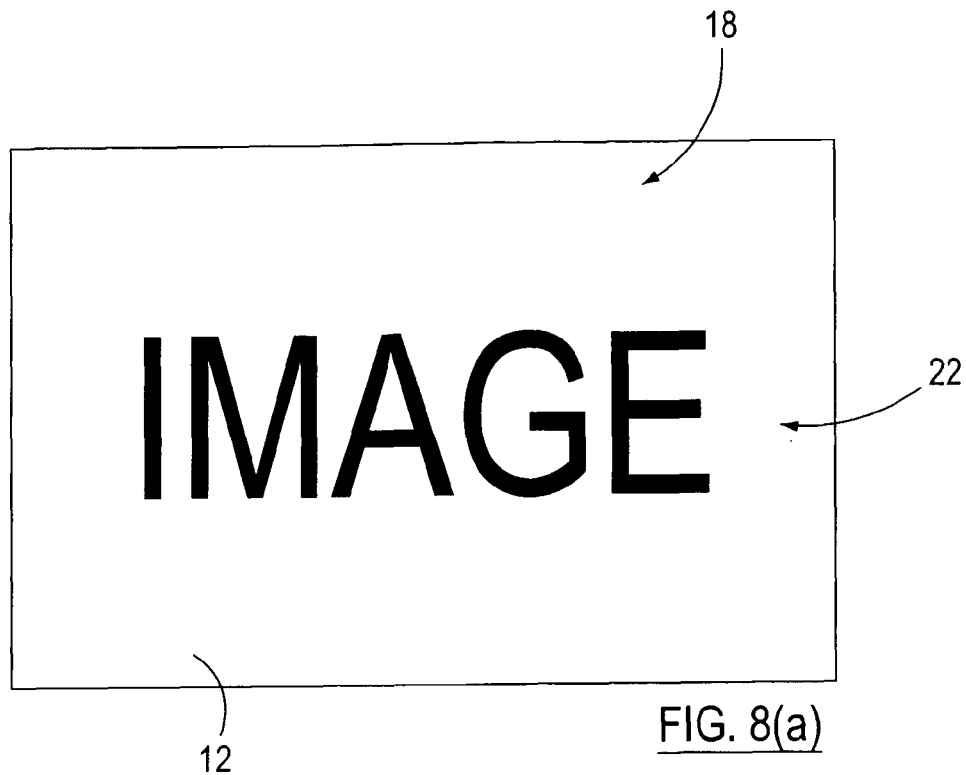
FIG. 8(a) is a left-to-right, correct-image or left-to-right, corrected-image visual display according to the present invention.
Figure 8B:
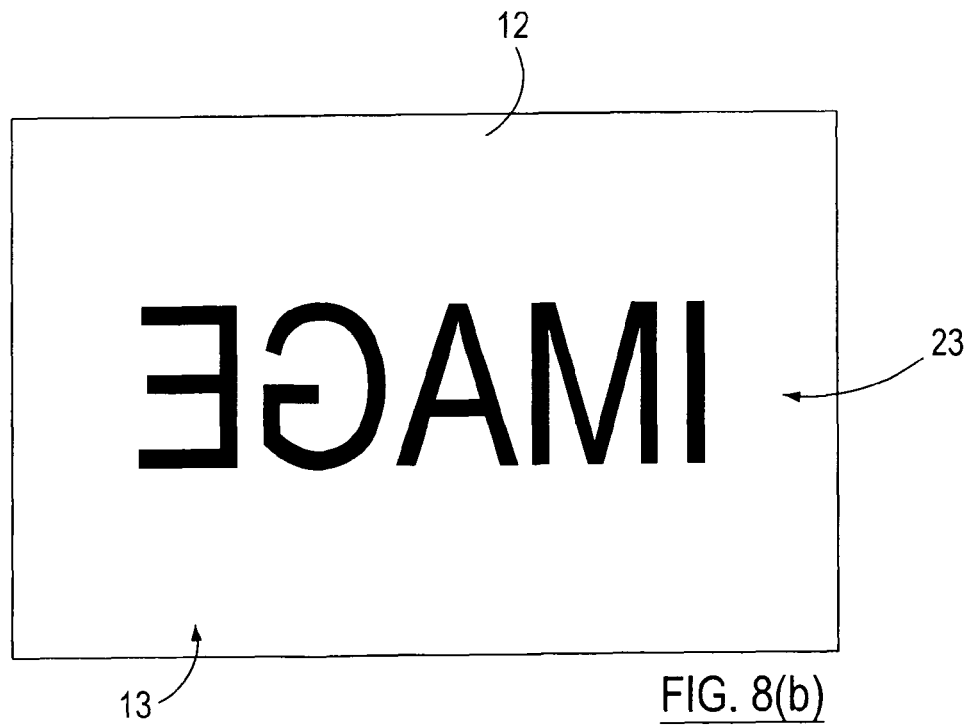
FIG. 8(b) is a left-to-right, reversed-image visual display according to the present invention.

Were this primary image 18 to be used for viewing the display screen 12, writing on the screen 12 would appear backwards as generally depicted in FIG. 8(b). Notably, there would be other distracting "backward" problems with the viewing of the picture.

However, with a secondary reflecting surface 21 interposed between the primary reflecting surface 15 and the viewer's eyes 120, the image 18 seen in the secondary reflecting surface 21 is again reversed and the image appears to the viewer 120 to be correctly oriented as at 22. That is, writing on the visual display screen 12 appears to be correctly oriented, and left and right in the picture are no longer interchanged.

Human eyes are typically spaced on the order of two to four inches apart (most often between 2.5 to 3 inches apart), and when focusing on object directly in front of the viewer, are both canted inward toward the object so as to each eye is turned slightly toward the other eye, and the lines of sigh converge on the object. This lateral rotation of the eyes is one of the input signals to the brain which provide depth information. Also, the lenses of the individual eyes focus by deformation of the lenses of the eyes to bring the distant object into clear focus. This also provides the mental processes with information as to the distance of the various objects on which the objects are focused.

A third, and also very important element in the creation of the perception of depth when viewing pictorial material is that the eyes do not receive identical pictures on the left and right retinas, but see slightly offset pictures. The human brain is capable of using the slight differences in the visual content of the two dimensional pictures received from each eye in the construction of the three dimensional image in the brain.

Current three dimensional viewing technology utilizes all of the visual clues present in normal viewing of the world, such as relative size, brightness, parallax (the horizontal shifting of the apparent position of objects when the head is moved from side to side), it also makes use of the above characteristics of human vision to reproduce, and even exaggerate the perception of depth.

While it has long been known that the perception of depth in photographic or rendered materials can be created by forcing the two eyes to see two different images which have been created by separate cameras, video cameras or artistic renderings creating two dimensional; pictures taken from the perspective of the two human eyes spaced somewhat apart, it has only recently been recognized that a substantial element in the creation of the three dimensional perception can be obtained by forcing the two individual eyes to see exactly the same picture, but with the picture shifted slightly in the horizontal direction.

For example, a television set capable of processing images taken from two cameras, and shown on alternating frames of the television set with the viewer wearing the appropriate shutter glasses can be altered electronically, so as to show only a series of images taken with a single camera, but with the original picture taken by the single camera shown on the screen to be viewed with the left eye, and a slightly shifted horizontally but otherwise identical picture shown on alternate screens for viewing with the right eye. This creates the perception of significant depth in the viewer's mind even though there is only the depth information provided by the subsidiary visual clues, such as color contrast, size, and brightness. However, for this system to produce the perception of depth in the pictures, both specially constructed television sets and special viewing glasses are required.

The subject invention involves a newly discovered technique for accomplishing much the same effect without the necessity of the specially constructed television set or the wearing of special glasses by utilizing a unique, and heretofore unrecognized characteristic of viewing reflective images.

It has been found that, when viewing images in mirrors, the eye does not focus on the surface of the mirror, but rather on the phantom image of a reflected object which appears to be behind the reflective surface by a distance just equal to the distance from the mirror to the objects. Thus the eyes are not focused on the actual image, at the distance to the reflective surface, but rather at a much greater distance. Therefore, as the line of sight from the mirror to the eye is a straight line to the reflective surface, and a straight line from the reflective surface forming an angle of reflection equal to the angle of incidence, each eye will actually see a slightly displaced image from the other.

The comfortable viewing range of the viewer in front of a television surface may be on the order of 10 feet or so. If the reflective surface is placed on the order of ten feet from the television receiver, and the viewer is also about ten feet away from the reflective surface, each individual pixel in slightly different locations on the screen, although there is only one such location. By forcing the eyes on the image of the television set rather than the television itself, each of the eyes will see the pixel in a different location on the reflective surface.

With human eyes spaced on the order of two to four inches apart (most often between 2.5 to 3 inches apart) or so, the images will, in the case where the spacings are equal, as shown above, result in a shifting of the apparent location of the television image by half that amount, or 1.25 inches. This is equivalent to focusing the eyes at a distance of 20 feet or so, which is comfortable and relaxed distance for viewing images which do not require detailed analysis. Greater or lesser distances have been found to satisfy the requirements for viewing two dimensional material with a significant perception of depth.

The images so perceived with a significant degree of depth are, of course, influenced by the composition of the picture, and to a lesser extent by the characteristics of the photographic optics involved. For example, picture of scenes or actions containing a wide dispersion of objects dispersed between the foreground and the background will provide many more clues for the mind to work with in creating a convincing perception of depth than will a scene which involves only foreground characters with, say, a blank wall behind them.

Also, cameras set to a relatively flat focus, which makes both foreground and background objects sharply defined will produce better depth perception than will a narrow focus which causes objects closer to or farther from objects at the focal distance to be less clearly defined.

Viewing condition which enhance the perception of depth when viewed by means of the subject invention include using a darkened room, such that the primary television receiver screen is much brighter than the surrounding objects, such that there is little to distract the viewer from focusing his eyes on the image of the screen in the mirror, as opposed to other objects which might also be reflected and distract from the overall effect.

The human eye arrangement is accustomed to viewing images which are separated only slightly for objects in the near distance and scarcely at all for far away objects. The human eye arrangement perceives the separation as clues to the distance of the object, and therefore as the perception of depth in the image. The human brain fills in the details, so to speak, and does so when the objects are too far away to provide any clear cut separation between the two images.

Figure 4:
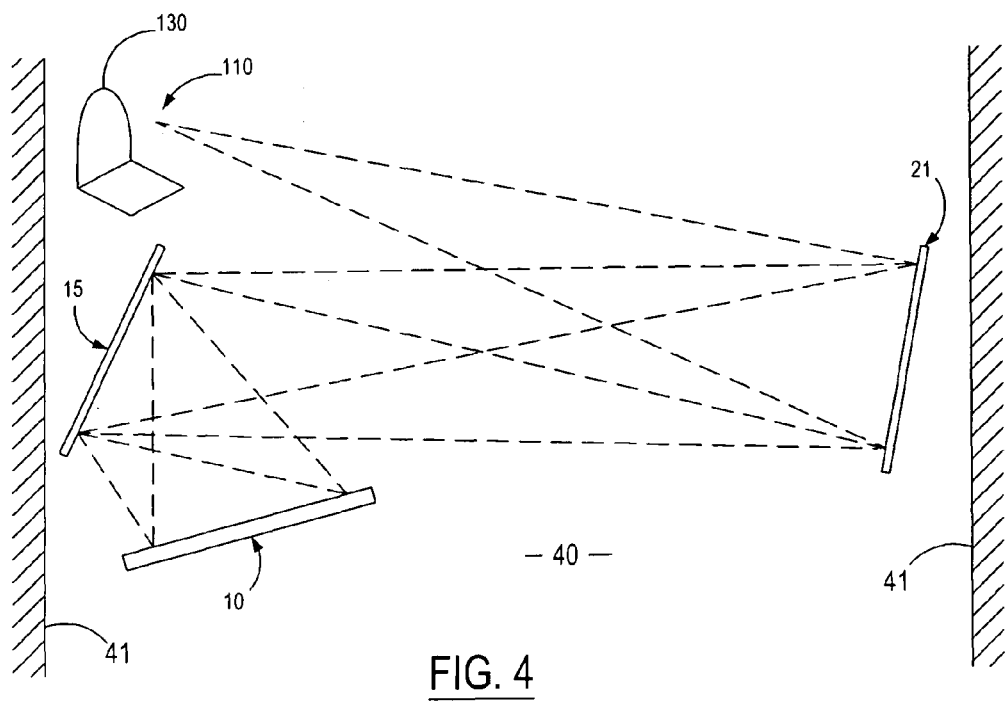
FIG. 4 is a diagrammatic depiction of a third alternative embodiment or method according to the present invention depicting a space bound laterally by walls with a television assembly, a primary mirror, a secondary mirror, and a seat depicted as being located within the space.

It has been found by experimentation that a comfortable distance for viewing the three-dimensional image 18 according to the present invention is at about 8 to 15 feet from a mirror 15 which is, in turn, about 8 to 15 feet from the television set 10 having a visual display screen 12 of moderate size (about 60 inches). That is, instead of sitting facing the visual display screen 12, the viewer may sit adjacent the television set or assembly 10, and view the image projecting from the visual display screen 12 as reflected from a mirror 15 placed across the room 40 (defined or bound by walls 41) from the viewer (e.g. seated as at 130) as generally depicted in FIG. 4. The viewer's image of the visual display screen 12 would appear as though it were 16 to 30 feet away, rather than the distance 116 to the mirror 15.

The image upon the visual display screen 12 would, of course, appear smaller to the viewer than the actual image since it appears to be twice as far away as the normal viewing distance. It has been found that there is a considerable amount of leeway as to the exact placement of the mirror 15 relative to the visual display screen 12. Accordingly, there is some flexibility as to the placement of each.

However, placing the mirror 15 too close to the visual display screen 12 does not provide for sufficient separation of the images to produce the illusion of depth in the reflected picture or image. Further, placing the mirror 15 too close to the viewer produces far more separation than is normally comfortable for viewing.

With reflective surfaces, the direction of the reflected ray 109 is determined by the angle of incidence 104 the incident ray 108 makes with the surface normal 105 (a line perpendicular to the surface 106 at the point where the incident ray 108 hits. The incident and reflected rays 108 and 109 lie in a single plane, and the angle of reflection 107 between the reflected ray 109 and the surface normal 105 is the same as that between the incident ray 108 and the normal 105 as per the law of (specular) reflection.

One disadvantage of viewing a visual display screen 12 via a mirror 15 is that the image is left-to-right reversed as at 13 in FIG. 8(b). Writing on the visual display screen 12, for example, appears backward. This is most easily correctable in two ways. The simplest method is to rewire the television assembly 10 so that it reverses the projecting image 18 from the visual display screen 12, and the reflected image appears "normal" or left-to-right corrected. Alternatively, some commercial television sets are designed to allow reverse viewing by simply pressing a button on the television remote control.

The second method is to utilize two mirrors, namely, a primary mirror as at 15, and a secondary mirror as at 21. A first of the mirrors 15/21 can be placed or positioned without regard for the degree of separation of the two images on the surface of the primary mirror 15, provided that the second mirror is placed appropriately for comfortable viewing.

For example, the first or primary mirror 15 could be placed immediately above a visual display screen 12 lying horizontal on a table on the same side of the room 40 as the viewer such that the left-to-right correct image 18 is directed vertically or orthogonally relative to the horizontal plane 100 of the visual display screen 12. The second or secondary mirror 21 could then be placed across the room 40, and adjusted to reflect (and correct) the left-to-right reversed image 13 of the first mirror 15 rather than the left-to-right correct image 18 projecting from the visual display screen 12.

Figure 2:
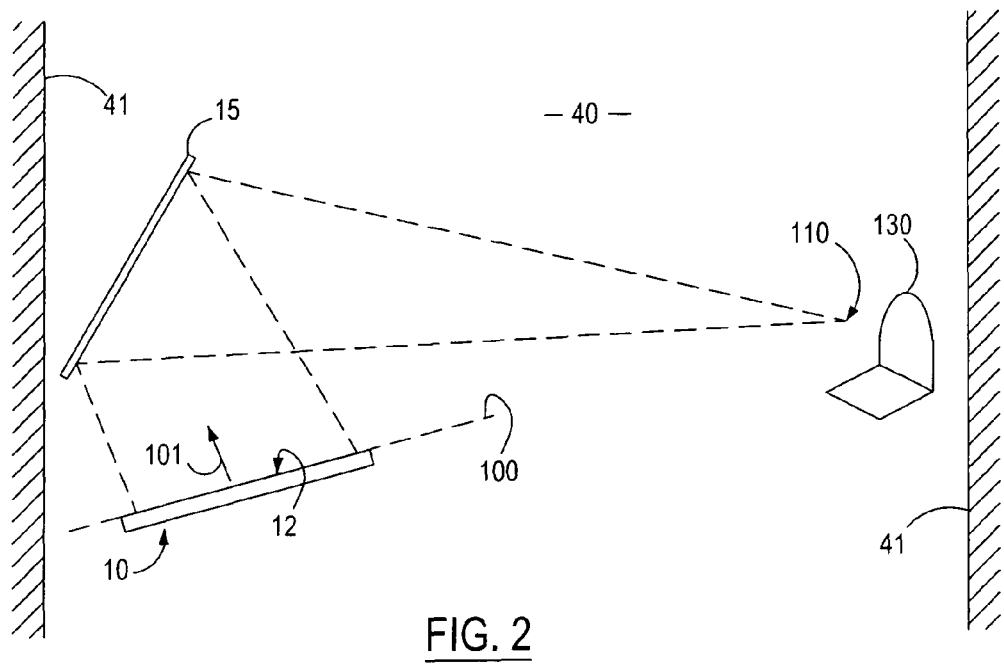
FIG. 2 is a diagrammatic depiction of a first alternative embodiment or method according to the present invention depicting a space bound laterally by walls with a television assembly, a primary mirror, and a seat depicted as being located within the space.

Referring now to the drawings with more specificity, FIG. 2 presents or depicts a first alternative embodiment or method according to the present invention. In FIG. 2, the primary image is produced by a conventional television assembly 10 which has been set to produce a left-to-right reversed image 13 from the visual display screen 12.

Some commercial television sets or assemblies 10 are equipped with certain means of reversing the image electronically via the remote control unit. Fir television receivers not so equipped, the image may be reversed on the screen 12 by reversing the horizontal sweep leads to the screen 12. The purpose of this alteration is to provide an image on the visual display screen 12 that is reversed left-to-right as generally depicted din FIG. 8(b).

The flat screen television assembly 10 with the left-to-right reversed imagery 13 is preferably mounted horizontally, or at an angle of 45 degrees or less to the horizontal, and the image produced so as to be visible from above the screen 12 as depicted in FIG. 7(a). A reflecting surface as preferably defined by a primary mirror 15 of adequate size (i.e. a size roughly equal to the that of the visual display screen 12) placed above the television assembly 10 and an angle to vertical so as to reflect the image produced by the visual display screen 12 toward a viewing audience across the room, or at a convenient distance from the mirror 15.

Such distance would be approximately the same as the comfortable viewing distance to a normal, vertically oriented television screen of comparable size. The mirror may preferably be of a commercial quality but the higher the quality of the reflecting surface, the better will be the resulting three-dimensional image.

The placement of the primary visual display screen 12, the mirror 15, and the viewing audience (as generically represented by chair 130) is optimally with the distance from the primary visual display screen 12 to the mirror 15 and from the mirror 15 to the viewing audience 130 equal, and also equal to the normal comfortable viewing distance for the television size and resolution. However, the distance from the primary screen to the television will likely be limited.

Limitations may include incorporating both the screen 12 and the mirror or reflecting surface 15 in a single cabinet as at 11, much as console television sets are often built, or by mounting the visual display screen 12 in a cabinet 11 with an open top or pivotable panel 25 such that a separately mounted mirror (perhaps mounted to a wall 41, or on a frame constructed to hold the mirror 15 at the proper angle). With these limitations, the distance from the primary visual display screen 12 to the mirror 15 should be as great as possible within the geometrical limitations imposed.

Figure 3:
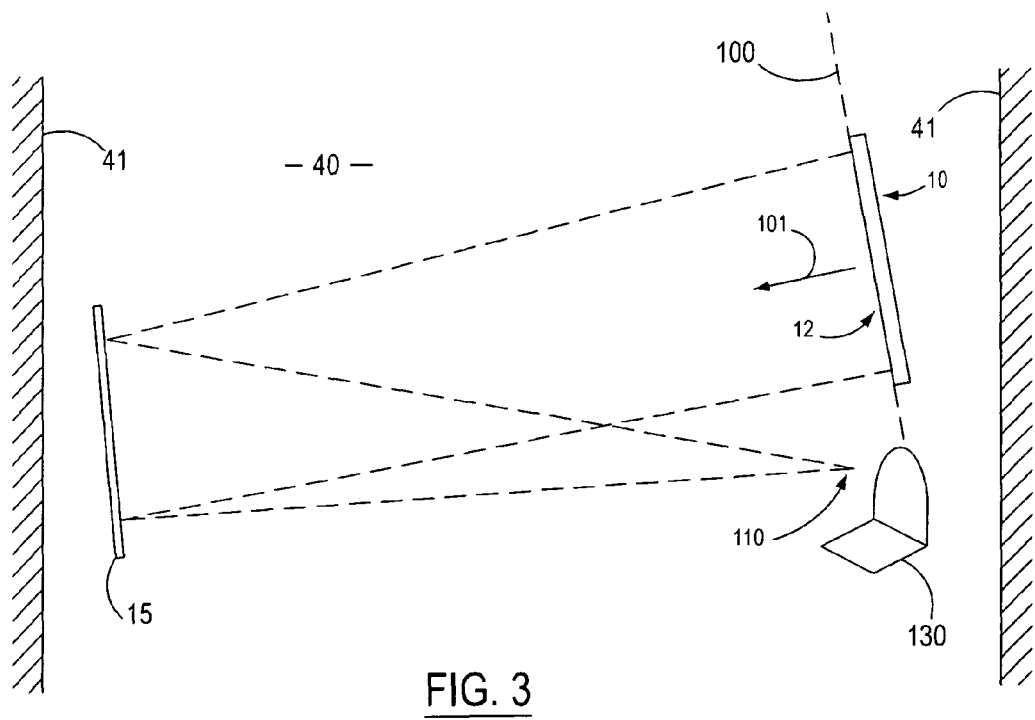
FIG. 3 is a diagrammatic depiction of a second alternative embodiment or method according to the present invention depicting a space bound laterally by walls with a television assembly, a primary mirror, and a seat depicted as being located within the space.

Referencing FIG. 3, a second alternative embodiment according to the present invention involves the use of a primary flat screen television assembly 10 with the raster leads reversed to display an image with left-to-right reversal. The second alternative differs from the first alternative in that the screen 12 is preferably mounted vertically in a location similar to conventional television viewing position.

A single or primary mirror 15 is placed opposite the visual display screen 12, and the viewing audience 130 is arranged in line with the primary television assembly 10 or nearly so. The distance between the primary television assembly 10 and the mirror 15 and between the mirror 15 and the viewing audience 130 should be as close as possible to the normal viewing distance for the size and picture quality of the television assembly 10.

A third alternative embodiment or method according to the present invention is generally depicted in FIG. 4. A conventional television assembly 10 may be incorporated into the three-dimensional scheme without the necessity of modifying the television assembly 10 to left-to-right reverse the image by adding a second or secondary mirror or reflecting surface 21.

The primary television assembly and mirror arrangement are substantially as set forth with regard to the first alternative embodiment; however, a second mirror 21 is incorporated into the scheme. While the first mirror reflects the image from the visual display screen 12 left-to-right as compared with the image on the screen 12, the second mirror 21, located perhaps on the opposite wall 41, reverses the image seen in the first mirror 15.

In this configuration, the viewing audience 130 is oriented in line with, or on the same side of the room as the primary television image and the first reflecting surface 15. Preferably, the viewing audience 130 should be at a comfortable viewing distance from the second surface 21, but the first mirror 15 should be placed as close as possible to the primary visual display screen 12.

Figure 5:
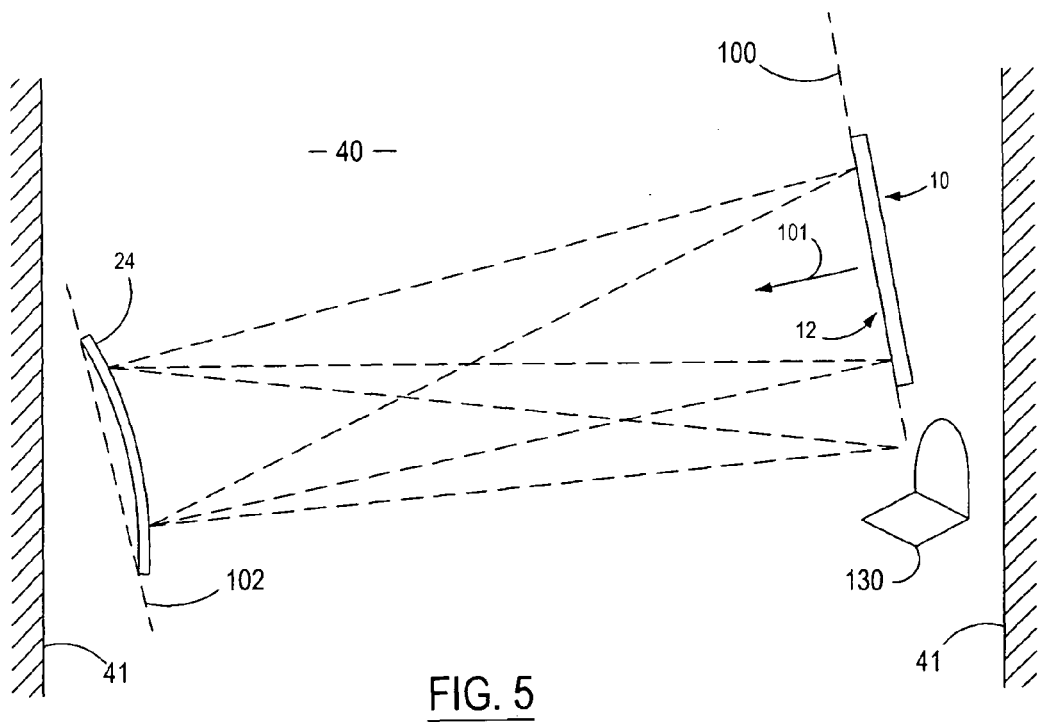
FIG. 5 is a diagrammatic depiction of a fourth alternative embodiment or method according to the present invention depicting a space bound laterally by walls with a television assembly, a primary convex mirror, and a seat depicted as being located within the space.
Figure 6:
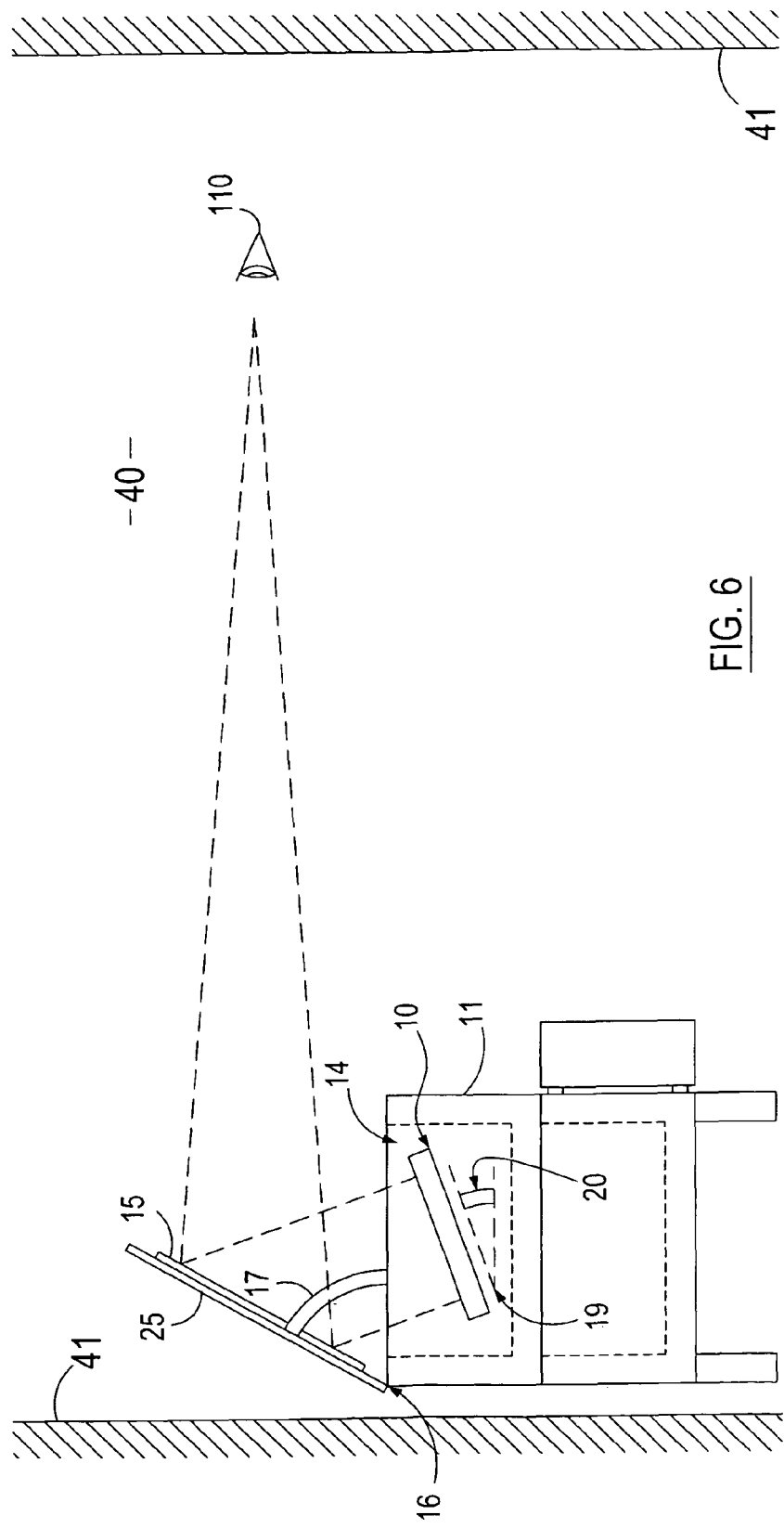
FIG. 6 is a diagrammatic depiction of a fifth alternative or preferred embodiment or method according to the present invention depicting a space bound laterally by walls with a cabinet assembly, outfitted with a primary mirror and housing a television assembly depicted as being located within the space.

Referencing FIG. 5, depicting a fourth alternative embodiment or method, a rectangular convex mirror 24 is shown. The convex mirror 24 is preferably viewed from the direction of the television assembly 10, visual display screen 12, and the viewing audience 130 for the final viewing surface. The primary purpose of the convex mirror 24 is to compensate for the reduction in picture size which necessarily occurs when the image of the visual display screen 12 is viewed from essentially twice the distance which would normally be used for direct viewing of the same screen 12. The geometry of the convex shape renders an image which is larger than the reflected image, and by choosing the correct spherical radius, the image can be enlarged sufficiently to compensate for greater than normal viewing audiences.

A projected image or a projected television unit could conceivably be substituted for the convention television assembly 10 in the first and second alternative embodiments. A reflecting mirror would be used in lieu of a conventional screen, and it would be necessary to reverse the presentation of the video tube raster scan if a single reflecting mirror is used as in the second alternative embodiment or method. Other embodiments of the basic invention can, no doubt, be established by one skilled in video techniques and optics.

In this last regard, for example, the present invention further contemplates a cabinet assembly 11 for enabling a user to view three-dimensional television, which cabinet assembly preferably comprises an assembly-receiving compartment as at 14 and an integrally received primary mirror or reflective surface 15. The primary mirror comprises a primary mirror plane as at 102 and certain mirror-pivot or mirror-adjustment means.

A left-to-right, reversed-image television assembly 10 is receivable by or in the assembly-receiving compartment 14 as generally depicted in FIGS. 7 and 7(a). The mirror-pivot or mirror-adjustment means enable the user to selectively pivot the primary mirror 15 about a mirror pivot axis as at 103. A left-to-right reversed visual display 13 from the visual display screen 12 of the television assembly 10 is reflectable from the primary mirror 15.

The mirror-pivot or mirror-adjustment means enable the user to adjust an angle of incidence 104 of the left-to-right reversed visual display 13 upon the primary mirror 15 relative to the mirror plane 102 or normal 105 for providing a reflected left-to-right correct visual display as at 18/22. The reflected left-to-right correct visual display 18/22 is stereoscopically observable according to principles set forth hereinabove by the user for effecting three-dimensional television viewing.

The cabinet assembly 11 may further preferably comprise certain screen-pivot or screen-adjustment means, which means are made cooperable with the received television assembly 10 in the compartment 14 for enabling a user to selectively pivot the visual display screen 12 of the received television assembly 10 about a screen pivot axis as at 111. Together, the screen- and mirror-pivot means enable the user to adjust the angle of incidence 104 of the left-to-right reversed visual display 13 for providing the reflected left-to-right correct visual display 18/22.

It has been found that if one places the mirror, either primary 15 or secondary 21, such that the viewer does not see much in it besides the visual display screen 12, it is much easier to see the clearly defined depth. If the mirror 15/21 is too big, and shows a lot of other objects in it besides the visual display screen 12, such an arrangement provides the viewer with visual clues as to the actual depth of things the viewer is seeing in the mirror, one of which is the television assembly 10. This makes it difficult to focus on the visual display screen 12 of the television assembly 10, and the viewer tends to lose the effect.

Likewise, the present system and/or method operate most effectively when the walls 41 behind the television assembly 10 and the mirror 15 are both relatively plain and uninteresting. Again, anything that provides visual clues as to the actual depth of the reflected visual image detracts from the effect. Finally, the present invention operates more effectively in a darkened room, where other visual references are minimized and the illuminated visual display screen dominates the field of vision.

While the above description contains much specificity, this specificity should not be construed as limitations on the scope of the invention, but rather as an exemplification of the invention. For example, it is contemplated that the present invention essentially provides a system of components or subassemblies for enabling a user or viewer to view three-dimensional television from a two-dimensional television set or assembly.

The system according to the present invention is believed to essentially comprise, in combination a television assembly as generally illustrated and referenced at 10; and a cabinet assembly as generally illustrated and referenced at 11. The television assembly 10 preferably comprises a visual display screen as at 12, and means for selectively providing a left-to-right reversed visual display (as at 13) upon the visual display screen 12. The visual display screen generally or inherently comprises a visual display plane as referenced at 100 such that the left-to-right visual display is directed orthogonally (as at vector 101) from the visual display plane 100.

The cabinet assembly 11 according to the present invention preferably comprises an assembly-receiving compartment as at 14 and a primary mirror assembly or mirror as at 15. The primary mirror 15 generally or inherently comprises a primary mirror plane as at 102 and certain mirror-pivot means as may be preferably exemplified by a cooperable hinge junction as referenced 16 and bracket type hardware as at 17.

The television assembly 10 is preferably received by or in the assembly-receiving compartment 14, and the mirror-pivot means enable the user to selectively pivot the primary mirror 15 about a mirror pivot axis as at 103. The left-to-right reversed visual display 13 is reflected from the primary mirror 15. The mirror-pivot means essentially function to enable the user to adjust the angle of incidence 104 of the left-to-right reversed visual display 13 upon the primary mirror 15 relative to the mirror plane 102 for providing a reflected left-to-right correct or corrected visual display (as at 18). The reflected left-to-right correct visual display or left-to-right corrected visual display 18 is stereoscopically observable (as generically referenced at 110) by the user for effecting three-dimensional television viewing.

The system according to the present invention may further preferably comprise certain screen-pivot means as may be preferably exemplified by a cooperable hinge junction as referenced 19 and bracket type hardware as at 20. The screen pivot means are made cooperable with the television assembly 10 for enabling the user to selectively pivot the visual display screen 12 about a screen pivot axis as referenced at 111.

The screen-pivot means and the mirror-pivot means or screen- and mirror-pivot means together essentially function to enable the user to adjust the angle of incidence 104 of the left-to-right reversed visual display 13 for providing the reflected left-to-right correct visual display 18 via angle of reflection 107. The screen pivot axis 111 and mirror pivot axis 103 are preferably parallel as generally illustrated, but may be either horizontally oriented as generally depicted in FIGS. 7 and 7(a) or vertically oriented (not specifically illustrated).

Alternatively, the system according to the present invention may comprise a secondary mirror assembly or secondary mirror as at 21, in combination with a television assembly 10 comprising certain means for selectively providing a correct left-to-right visual display as generally referenced at 22 upon the visual display screen 12. The correct left-to-right visual display 22 provides a reflected left-to-right reversed visual display (as at 23) from the primary mirror 15, and the reflected left-to-right reversed visual display 23 provides a reflected left-to-right corrected visual display as at 18 from the secondary mirror 21. The reflected left-to-right corrected visual display 18 is stereoscopically observable as at 110 by the user for effecting three-dimensional television viewing.

Other optional or alternative features include defining the primary mirror 15 as a convex mirror as generally depicted and referenced at 24. It is contemplated that the convex mirror construction may well operate to enhance the stereoscopic observability of the visual display(s) 18 (or 22). Further, the cabinet assembly 11 may preferably comprise a pivotable panel as at 25, which pivotable panel 25 is cooperable with the primary mirror 15 and inherently comprises a panel plane as at 112.

As may be seen from an inspection of FIGS. 7 and 7(a), the mirror and panel planes 102 and 112 are preferably parallel. It is contemplated that the pivotable panel 25 may be attached to the primary mirror 15 for enabling the user to selectively enclose the primary mirror assembly 15 in adjacency to the television assembly 10 within the compartment 14 as generally depicted in FIG. 7(a).

The foregoing considerations are further believed well able to support a method for viewing three-dimensional television, which method comprises the steps of: providing a left-to-right, reversed-image television assembly 10; providing a left-to-right reversed visual display 13 upon said television assembly 10; positioning or adjusting a primary mirror or reflective surface 15 opposite the left-to-right reversed visual display 13 for effecting a reflected left-to-right corrected visual display 18/22 from the primary mirror 15; and stereoscopically observing 110 the reflected left-to-right corrected visual display 18/22 from the primary mirror 15.

The method may further comprise the steps of receiving the television assembly 10 in an assembly-receiving compartment 14 of a cabinet assembly 11; attaching the primary mirror 15 to the cabinet assembly 11 before positioning or adjusting the primary mirror 15 opposite the left-to-right reversed visual display 13; and adjusting the direction of (1) the left-to-right reversed-image visual display 13 and (2) the left-to-right corrected visual display 18/22 relative to one another, as for example via the mirror-pivot or adjustment means and the screen-pivot or adjustment means.

Accordingly, although the invention has been described by reference to certain preferred and alternative embodiments, and certain methodology, it is not intended that the novel disclosures herein presented be limited thereby, but that modifications thereof are intended to be included as falling within the broad scope and spirit of the foregoing disclosure, the following claims and the appended drawings.

I claim:

1. A system for enabling a viewer to view three-dimensional television programs, or other pictorial displays on a display device, without the need for special means of preparation of visual material, the need for electronic alternation of the display device, and the need for special glasses for the viewer, the system comprising, in combination:

the display device having an essentially flat visual display screen;

a planar reflecting surface placed opposite to said visual display screen and so adjusted that a viewer may see complete view of a visual display displayed on said visual display screen reflected from said reflecting surface;

means for reversing the visual display so reflected to provide a correct left to right perception of said visual display to the viewer; and means for approximately spacing said visual display screen and said planar reflecting surface such that the viewer's perception of the visual display displayed on the visual display screen is in the range of one quarter of to four times of the comfortable viewing distance of the viewer to the planar reflecting surface, thereby causing the viewer to focus his eyes on the more distant reflection of the visual display screen, rather than on the reflective surface, and requiring the viewer to perceive slightly offset reflections of the visual display screen in the reflective surface, accomplishing sufficient separation of the views received by the left and right eyes of the viewer to create the perception of depth in the pictures displayed on the visual display screen.

2. The system of claim 1 wherein the flat visual display screen comprises a conventional flat panel television receiver or computer monitor screen.

3. The system of claim 1 wherein the planar reflecting surface comprises an ordinary glass mirror.

4. The system of claim 1 wherein the means for reversing the reflected visual display consists of reversing leads to raster display terminals of a conventional television receiver, either by modification of the receiver or by application of a reversing procedure by remote or panel mounted control built into the television receiver.

5. The system of claim 1 wherein the means for reversing the reflected visual display comprises the inclusion of a primary reflecting surface arranged so as to reflect the full image of the visual display screen to the planar reflecting screen, which now acts as a secondary reflecting surface, and thence to the viewer, removing the requirement for reversing the display on the visual display screen.

6. The system of claim 1 in which the distance from the visual display screen to the planar reflecting surface is in the range of one half to two times the comfortable viewing distance of the planar reflecting surface.

7. The system of claim 1 where the distance from the visual display screen to the planar reflecting surface is in the range of three quarters to one and one half times the comfortable viewing distance of the planar reflecting surface.

8. The system of claim 1 wherein the visual display screen and a primary planar reflecting surface are combined in a cabinet with a secondary surface arranged orthogonally from the visual display plane, the cabinet assembly comprising an assembly-receiving compartment and a primary reflecting surface, the primary reflecting surface comprising a mirror plane and surface-pivot means, a television assembly being received by the assembly-receiving compartment, the surface-pivot means for enabling the viewer to selectively pivot the primary reflecting surface about a surface pivot axis, the left-to-right reversed visual display being reflectable from the primary reflecting surface, the surface-pivot means for enabling the viewer to adjust an angle of incidence of the left-to-right reversed visual display upon the primary reflecting surface for providing a reflected left-to-right correct visual display, the reflected left-to-right correct visual display being stereoscopically observable by the viewer for effecting three-dimensional television.

9. A system for enabling a viewer to view three-dimensional television programs, or other pictorial displays on a display device, without the need for special means of preparation of visual material, the need for electronic alternation of the display device, and the need for special glasses for the viewer, the system comprising, in combination:

the display device having a visual display screen, the visual display screen comprising a visual display plane;

means for selectively providing a left-to-right reversed visual display upon the visual display screen, the left-to-right reversed visual display being directed orthogonally from the visual display plane; and a primary reflecting surface, the primary reflecting surface comprising a mirror plane, the left-to-right reversed visual display being reflectable from the primary reflecting surface for providing a reflected left-to-right correct visual display, the visual display plane being spaced from the mirror plane such that the viewer's perception of the visual display screen causes the viewer to focus on a point behind the mirror plane thereby requiring the viewer to perceive laterally offset reflections of the visual display screen in the mirror plane to create perception of depth in imagery displayed upon the visual display screen, the visual display plane and the mirror plane being spaced in the range of one quarter to four times of the comfortable viewing distance of the viewer to the mirror plane.

10. The system of claim 9 wherein the visual display plane and the mirror plane are spaced in the range of one half to two times the comfortable viewing distance of the viewer to the mirror plane.

11. The system of claim 10 wherein the visual display plane and the mirror plane are spaced in the range of three quarters to one and one half times the comfortable viewing distance of the viewer to the mirror plane.

12. The system of claim 9 comprising a cabinet assembly, the cabinet assembly for positioning the visual display screen relative to the primary reflecting surface.

13. The system of claim 12 comprising surface-pivot means, the surface-pivot means for enabling the viewer to selectively pivot the primary reflecting surface about a surface pivot axis for adjusting an angle of incidence of the left-to-right reversed visual display upon the primary reflecting surface for providing a reflected left-to-right correct visual display.

14. The system of claim 12 comprising screen-pivot means, the screen pivot means made cooperable with the visual display screen for enabling the viewer to selectively pivot the visual display screen about a screen pivot axis, the screen- and surface-pivot means together for enabling the viewer to adjust the angle of incidence of the left-to-right reversed visual display for providing the reflected left-to-right correct visual display.

15. The system of claim 9 comprising a secondary reflecting surface and means for selectively providing a correct left-to-right visual display upon the visual display screen, the correct left-to-right visual display for providing a reflected left-to-right reversed visual display from the primary reflecting surface, the reflected left-to-right reversed visual display for providing a reflected left-to-right corrected visual display from the secondary reflecting surface, the reflected left-to-right corrected visual display being stereoscopically observable by the viewer.

16. The system of claim 9 wherein the primary reflecting surface is convex, the convex reflecting surface for enhancing the stereoscopic observability of the visual display screen.

17. A method for enabling a viewer to view three-dimensional television programs, or other pictorial displays, without the need for special means of preparation of visual material, the need for electronic alternation of display device, and the need for special glasses on the part of the viewer, the method comprising the steps of:

providing a visual display screen, the visual display screen comprising a visual display plane;

providing a left-to-right, reversible-image upon the visual display screen;

providing a left-to-right, reversed-image visual display upon said visual display screen;

positioning a primary reflecting surface opposite to the left-to-right, reversed-image visual display for effecting a reflected left-to-right, corrected-image visual display from the primary reflecting surface, the primary reflecting surface comprising a mirror plane, the visual display plane and the mirror plane being spaced in the range of one quarter to four times of a comfortable viewing distance of the viewer to the mirror plane for causing the viewer to focus his eyes on the more distant reflection of the visual display screen rather than on the reflective surface and requiring the viewer to perceive slightly offset reflections of the visual display screen in the reflective surface accomplishing sufficient separation of the views received by the left and right eyes of the viewer to create the perception of depth in the pictures displayed on the visual display screen; and stereoscopically observing the reflected left-to-right, corrected-image visual display from the primary reflecting surface.

18. The method of claim 17 wherein the visual display screen is positioned by way of a cabinet assembly.

19. The method of claim 18 wherein the primary reflecting surface is positioned by way of the cabinet assembly before positioning the primary reflecting surface opposite the left-to-right, reversed-image visual display.

20. The method of claim 19 wherein the direction of (1) the left-to-right, reversed-image visual display and (2) the left-to-right, corrected-image visual display are adjusted relative to one another.

21. The method according to claim 17 wherein a left-to-right, correct-image visual display upon said television assembly is provided;

the primary reflecting surface being positioned opposite the left-to-right, correct-image visual display for effecting a reflected left-to-right, reversed-image visual display from the primary reflecting surface;

a secondary reflecting surface being positioned opposite the left-to-right, reversed-image visual display for effecting a reflected left-to-right, corrected-image visual display from the secondary reflecting surface; and the reflected left-to-right, corrected-image visual display being stereoscopically observable from the secondary reflecting surface.

22. The method of claim 17 wherein the primary reflecting surface is convex, the convex, primary reflecting surface for enhancing the stereoscopic observability of the visual display screen.

23. The method of claim 21 wherein a select reflecting surface is convex, the select reflecting surface being selected from the group consisting of the primary and secondary reflecting surfaces, the select reflecting surface for enhancing the stereoscopic observability of the visual display screen.

* * * * *